United States Patent [19]

Raterman

[11] Patent Number: 5,202,294

[45] Date of Patent: Apr. 13, 1993

[54] LOW PRESSURE DROP REGENERATION OF A CATALYST

[75] Inventor: Michael F. Raterman, Doylestown, Pa.

[73] Assignee: Mobil Oil Corporation, Fairfax, Va.

[21] Appl. No.: 797,662

[22] Filed: Nov. 25, 1991

[51] Int. Cl.$^5$ .................. B01J 38/36; B01J 38/34; B01J 29/38; C10G 11/18

[52] U.S. Cl. .................................. 502/43; 208/113; 208/120; 208/161; 208/164; 423/144; 502/42

[58] Field of Search ................... 502/40–43; 208/164, 113, 120

[56] References Cited

U.S. PATENT DOCUMENTS

| | | | |
|---|---|---|---|
| 2,584,391 | 2/1952 | Leffer | 23/288 |
| 2,862,786 | 12/1958 | Trainer | 502/41 |
| 3,926,778 | 12/1975 | Owen et al. | 502/40 |
| 4,820,404 | 4/1989 | Owen | 208/159 |
| 5,011,592 | 4/1991 | Owen et al. | 502/42 |

Primary Examiner—Paul E. Konopka
Attorney, Agent, or Firm—Alexander J. McKillop; Malcolm D. Keen; Richard D. Stone

[57] ABSTRACT

A process and apparatus for the regeneration of spent FCC catalyst in a single vessel are disclosed. In one embodiment, catalyst is at least partially regenerated in a primary stage comprising a fast or turbulent fluidized bed. The flue gas is discharged up, with some and preferably most of the catalyst discharged laterally, through windows, into a second fluidized bed, preferably disposed as an annulus about the first. In another embodiment a cyclone separator is closely coupled to, but spaced from, the primary regeneration stage, to rapidly separate catalyst from first stage flue gas, and minimize thermal stress.

11 Claims, 4 Drawing Sheets

LOW PRESSURE DROP REGENERATION OF A CATALYST

BACKGROUND OF THE INVENTION

1. Field of the Invention

The invention relates to a process and apparatus for the regeneration of fluidized catalytic cracking catalyst.

2. Description of Related Art

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.-600° C., usually 460° C.-560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.-900° C., usually 600° C.-750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20-60 seconds, much less contact time is needed. The desired conversion of feed can now be achieved in much less time, and more selectively, in a dilute phase, riser reactor. The benefits of riser reactor FCC units are such that many older units have been revamped to take advantage of this advance in technology.

There have been many improvements in the design of FCC regenerators. The considerable evolution in the design of FCC units is reported to a limited extent in the Jan. 8, 1990 Oil & Gas Journal article.

Most new regenerators are of the high efficiency design, i.e., the spent catalyst, preferably with recycled regenerated catalyst, is charged to a fast fluidized bed coke combustor, and from their to a dilute phase transport riser. Coke is efficiently burned in the robustly fluidized coke combustor, while CO afterburning is promoted by the dilute phase conditions in the transport riser. Such regenerators are now the standard for new construction, and are shown in U.S. Pat. No. 4,820,404, Owen, U.S. Pat. No. 4,353,812, Lomas et al, and many others. These two patents are incorporated herein by reference.

These are excellent regenerators, which greatly reduce the amount of catalyst inventory needed to process a given amount of fresh feed. The only areas where such regenerators sometimes have problems is particulates emissions, and somewhat higher pressure drop than is desirable.

Dust emissions can be a problem in some areas with these regenerators. They are somewhat "dusty" because all of the catalyst inventory is discharged as a dilute phase up the transport riser to an outlet in a dilute phase region above a second fluidized bed. High vapor velocities are needed to get the catalyst, the volume of which is usually multiplied by 100 to 300% due to catalyst recycle, up through the coke combustor and transport riser. Adding cyclones to the transport riser outlet can greatly reduce particulates emissions due to such large amounts of catalyst through the transport riser, but cyclones add to the cost and complexity of such units, and cyclones also add to the pressure drop across the regenerator.

Even when cyclones are not needed, there is a significant pressure drop, and a significant amount of work, involved in moving extremely large volumes of catalyst around such units. Although the benefits or reduced catalyst inventory, and more efficient regeneration of catalyst, and dilute phase controlled afterburning of CO to CO2 in the transport riser, when desire, are worth the pressure drop, it would be beneficial if the desirable regeneration characteristics of such units could be retained, but without all the pressure drop (or energy consumption) required to get catalyst up through a fast fluidized bed coke combustor and a dilute phase transport riser.

Such modern regenerator designs, sometimes called a high efficiency regenerator, are preferred for all new construction. For the many FCC units built with low efficiency, i.e., bubbling dense bed regenerators, it has not been possible and/or economically justifiable to improve the efficiency of the bubbling bed regenerator.

Such bubbling bed regenerators are inherently inefficient because of the presence of large gas bubbles, poor catalyst circulation, and the stagnant regions. The bubbling bed regenerators usually have two to three times the catalyst inventory of more modern regenerators. The increased inventory, and longer catalyst residence time, make up for a lack of efficiency.

For such units, characterized by a single, bubbling dense bed regenerator, there has been no good way to achieve the benefits of high efficiency regeneration. Site constraints and capital spending constraints usually prevent replacement of a bubbling bed regenerator with a high efficiency regenerator.

Site constraints also usually make modifications, such as those that would permit several stages of regeneration to be achieved in a single vessel, prohibitively expensive. Part of the difficulty is that usually some form of baffling or separation is needed to achieve multistage regeneration, i.e., the fluidized bed regions must be isolated, and the flue gas from each region must be isolated. Some means of recovering catalyst from flue gas is usually essential, because even in bubbling bed regenerators with relatively low superficial vapor velocities there is a tremendous amount of catalyst entrainment into the dilute phase. Multiple cyclones in parallel, with multiple stages of cyclones, i.e., in series, are usually needed to recover catalyst from flue gas. These cyclones are heavy, and difficult to support, and when multiple stages of catalyst regeneration are involved, and great swings in temperature must be accommodated in the regenerator, the problems of cyclone support, and thermal stress, multiply.

It would be beneficial if a way could be found to convert these older, bubbling dense bed regenerators into higher efficiency units, preferably ones which could operate with relatively low pressure drop, and most preferably with staged regeneration, with isolation of each stage. This presented several complications.

It was easy to isolate the dense phase fluidized bed regions—the catalyst acted like a liquid, and a simple solid baffle would effectively isolate one fluidized region of catalyst from the other. Baffled regions, defining isolated fluidized beds sharing a common vapor region above, are common. U.S. Pat. No. 2,584,391 disclosed an apparatus with a baffled fluidized bed region which could be said to define multiple dense phase regions in a fluidized bed, but the vapor phases from each fluidized bed were mixed together and withdrawn from a single outlet. This was an improvement, it gave the option to achieve multiple stage regeneration, but added the constraint that the flue gas streams had to be compatible. If an attempt were made to operate the apparatus shown in U.S. Pat. No. 2,584,931 as a regenerator, with the inner stage in partial CO combustion mode, and the outer stage in complete CO burn mode, with an oxidizing atmosphere, the two flue gases would "afterburn" when mixed together in the dilute phase region above the dense beds. The lack of sufficient spent catalyst, to absorb the heat of combustion, would lead to extremely high temperatures in the flue gas line and in the cyclones, which could damage the unit.

Physical isolation of each combustion stage, by using, e.g., a closed first stage vessel immersed within a second stage, with cyclone separators mounted on the first stage vessel to separate catalyst from flue gas discharged from the first stage, would require considerable capital expense, an unduly large pressure drop, and cause severe technical problems due to thermal expansion. The first stage cyclones must be closely coupled to the primary stage vessel, and the cyclone outlets must be connected to the top of the vessel holding both stages. FCC regenerators are subjected to great variations in temperature, and the variations can be especially severe when multiple stages of regeneration are involved. As an example, during startup, or when a high CCR feed is first charged to the unit, the first stage of the regenerator will frequently run hotter, causing considerable thermal expansion. If the unit is all tied together, with the first stage regenerator, superimposed cyclones, and cyclone outlets passing through the top of the containment vessel, then some parts of the regenerator will be subjected to considerable mechanical stress. Expansion joints can be used, but most refiners are reluctant to use these expensive, and relatively fragile, devices within the harsh environment of an FCC regenerator.

I discovered a way to reduce the pressure drop heretofore associated with multiple bed regenerators. In a preferred embodiment, I provided a way to conduct multi-bed, and multi-stage regeneration of catalyst with relatively low pressure drop. In an especially preferred embodiment, I use cyclone separators, connective with the first stage of the regenerator, to separate catalyst from flue gas, without subjecting the regenerator to excessive thermal stress. In this embodiment, it is possible to isolate the flue gas from each stage of the regenerator so that one stage can operate in partial CO burn mode, and another can operate in complete CO burn mode.

BRIEF SUMMARY OF THE INVENTION

Accordingly, the present invention provides a process for low pressure drop, fast or turbulent fluidized bed regeneration of spent, coke containing fluidized catalytic cracking catalyst in a single regenerator vessel having a ceiling and a base and containing at least a primary and a secondary contiguous relatively dense phase fluidized beds under a common dilute phase region, comprising: charging said spent catalyst to a fast or turbulent fluidized bed primary regeneration stage having a coked catalyst inlet means, an oxygen containing regeneration gas inlet means in a lower portion of said primary stage, and a primary stage flue gas outlet in an upper portion thereof; at least partially regenerating said coked catalyst by contacting said coked catalyst with said regeneration gas at fast or turbulent fluidized bed catalyst regeneration conditions to produce at least partially regenerated catalyst and flue gas; vertically discharging flue gas and some entrained catalyst from said upper portion of said primary stage into said common dilute phase region; laterally removing at least a portion of said partially regenerated catalyst by passing same though at least one lateral opening in a side of said primary stage at an elevation intermediate said primary stage regeneration gas inlet and said primary stage flue gas outlet; collecting said at least partially regenerated catalyst in said second fluidized bed; and removing regenerated catalytic cracking catalyst from said second fluidized bed as a product of the process.

In another embodiment, the present invention provides a process for the fast fluidized bed regeneration of spent, coke containing fluidized catalytic cracking catalyst in a single regenerator vessel having a ceiling and a base and containing both a centrally located primary regeneration stage within a generally vertical, cylindrical vessel having a coked catalyst inlet means, an oxygen containing regeneration gas inlet means in a lower portion thereof, and a vertical, cylindrical primary stage flue gas outlet having a vertical axis and a radius in an upper portion thereof and a secondary stage comprising an annular relatively dense phase fluidized bed disposed about said primary stage, comprising: at least partially regenerating in said primary regeneration stage said coked catalyst by contact with said regeneration gas at fast fluidized bed catalyst regeneration conditions to produce at least partially regenerated catalyst and flue gas; vertically discharging flue gas and some entrained catalyst from said vertical cylindrical primary stage flue gas outlet into a cyclone separation means having a vertical, cylindrical cyclone inlet pipe having a radius and a diameter, and wherein said cyclone inlet is radially spaced from and inserted within or encompasses said primary stage flue gas outlet; separating entrained catalyst from flue gas in said cyclone and discharging entrained catalyst to said secondary stage relatively dense phase fluidized bed disposed as an annulus about said primary stage; and recovering regenerated catalyst from said secondary stage.

In an apparatus embodiment, the present invention provides an apparatus for the regeneration of spent, coke containing fluidized catalytic cracking catalyst comprising: a single regenerator vessel having a ceiling and a base and having an inlet for spent catalyst connective with a primary regeneration stage and an outlet for regenerated catalyst connective with a secondary stage containing regenerated catalyst; said primary regenerator stage adapted to maintain said spent catalyst as a fast fluidized bed and comprising a generally vertical, cylindrical vessel connective with said coked catalyst inlet, and having in a lower portion of said primary stage an oxygen containing regeneration gas inlet, and in an upper portion thereof a vertical, cylindrical primary stage flue gas outlet having a vertical axis and a radius a primary stage cyclone separation means having a vertical, cylindrical cyclone inlet pipe having a radius which is different than the radius of the primary stage flue gas outlet, and wherein said cyclone inlet is inserted within or encompasses said primary stage flue gas outlet, said cyclone having an outlet for flue gas with a reduced catalyst content and a recovered catalyst outlet connective with a second fluidized bed within said regenerator vessel; a secondary stage adapted to maintain catalyst discharged from said first stage as a relatively dense phase fluidized bed disposed about said primary stage, and comprising an annular fluidized bed disposed about said primary regenerator stage and having in a lower portion thereof an inlet for oxygen containing regeneration gas or fluidizing gas and an outlet for regenerated catalyst.

In a preferred apparatus embodiment, the primary stage comprises a vertical cylinder having a cylinder wall with a plurality of lateral openings to said secondary stage in said cylinder wall at an elevation intermediate said primary stage regeneration gas inlet and said primary stage flue gas outlet.

DESCRIPTION OF PREFERRED EMBODIMENTS

Bubbling Bed Regenerators

In all bubbling dense regenerators commonly used the spent catalyst is added to the bubbling dense bed, and regenerated catalyst is withdrawn from the same dense bed. There is only a single flue gas, and a single dilute phase over the bubbling dense bed. There are other designs, not shown, which have baffles dividing the bubbling dense bed region into two or more bubbling dense bed regions, under a common vapor space.

Figure 1:
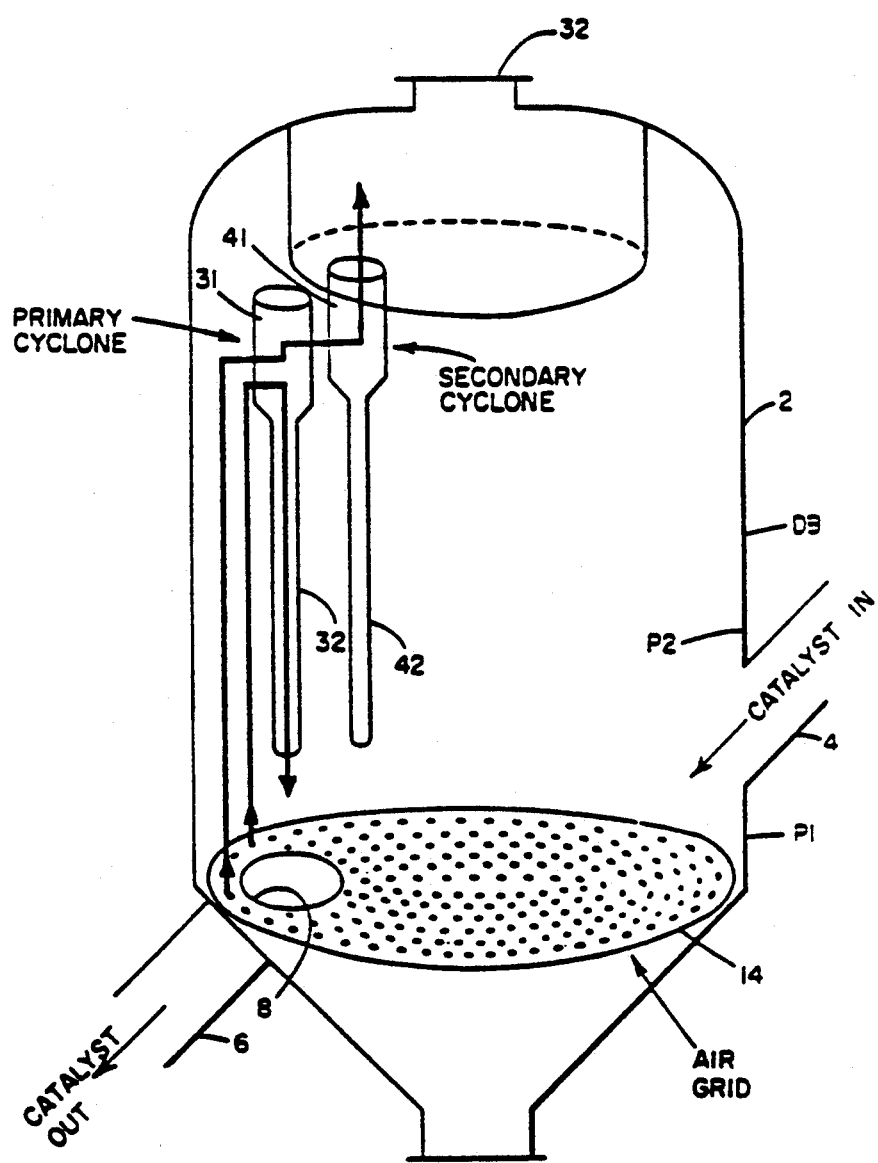
FIG. 1 (prior art) is a schematic view of a conventional FCC regenerator, taken from FIG. 1 of U.S. Pat. No. 4,980,048.

FIG. 1 (prior art) is a simplified schematic view of a cross flow FCC regenerator of the prior art, as shown in U.S. Pat. No. 4,980,048, Sapre et al, which is incorporated by reference.

This design, especially as modified in the '048 patent, is a good bubbling dense bed regenerator, although there are other types such as the cross-flow regenerator shown in U.S. 4,994,424, Sapre et al, which is incorporated by reference. Another good dense bed regenerator design is used in the Kellogg Ultra Orthoflow converter Model F shown as FIG. 17 of Fluid Catalytic Cracking Report, in the Jan. 8, 1990 edition of Oil & Gas Journal. The invention is not limited to any one type of regenerator, and may be beneficially used in any existing bubbling bed regenerator, or used in a new, grass-roots unit.

Referring now to FIG. 1, spent catalyst in line 4 passes down into regenerator 4. Air passes up into the regenerator via air grid 14, and fluidizes and regenerates the catalyst, which is maintained as a bubbling fluidized dense phase bed.

Catalyst flows across the regenerator, and is removed via sink 8 in the base of the air grid 14, which is therefore on the bottom of the bubbling fluidized bed of catalyst.

Flue gas and entrained catalyst rise above the bubbling bed, pass through primary cyclone 31 and secondary cyclone 41. Catalyst is recycled to the dense bed via diplegs 32 and 42, while flue gas is discharged via outlet 32.

Regenerated catalyst withdrawn from the regenerator via line 6 is passed to a riser reactor, not shown, where it contacts and cracks a fresh hydrocarbon feed to produce cracked products and spent catalyst. These are separated, and the spent catalyst stripped with steam in a catalyst stripper, not shown, to produce stripped catalyst which is charged via line 4 to the regenerator.

These conventional regenerators are extremely large. A review of some typical units provides an idea of the immense size of these units.

The approximate dimensions of a typical cross flow regenerator, associated with a typical 20,000 BPD cracking unit are as follows. The overall ID of the regenerator vessel is about 16 feet. The catalyst flow is 1200 tons/hr into the regenerator. The catalyst is added via one tangential inlet pipe having an ID of 18 inches. The catalyst velocity as it leaves the inlet is about 5 feet per second. It is discharged at an angle (40 degrees) as shown in FIG. 1 into a dense phase fluidized bed of catalyst having a depth of about 12 to 20 feet for withdrawal of catalyst. The sink is at the opposite side of the regenerator from the catalyst inlet.

Many cross-flow regenerators are somewhat larger than this. The regenerator associated with a 50–60,000 BPD unit will have a catalyst inventory of around 200 tons or more and will be much larger than the smaller unit described above. The diameter will be about 30 to 36 feet, and the catalyst inlet line ID about 3 feet. Catalyst flow into the regenerator will be 3600 tons per hour. The dense bed of catalyst has a depth of 10–15 feet. The bathtub will have an ID of about 7 or 8 feet.

The superficial vapor velocities in such regenerators are typically low, in large part to minimize catalyst entrainment. Although there is considerable variation between units, and some variation because of pressure and geometry of the regenerator, in most the superficial vapor velocity will be from 0.1 to at most 1 or perhaps 2 feet per second. In many bubbling dense bed regenerators the superficial vapor velocity will range from 0.15 to 0.75 feet per second, with a majority operating near 0.2 to 0.5 feet per second.

Although the superficial velocities are fairly low, the pressure drop associated with such regenerators are fairly large. The catalyst inventory is fairly large in such units, because of the relatively low efficiency of such regenerators, and the relatively high dense phase densities produce a pressure at the base of the regenerator, where the air is added is typically 2 to 3 psi higher than the pressure at the top of the dense bed.

High Efficiency Regenerators

Figure 2:
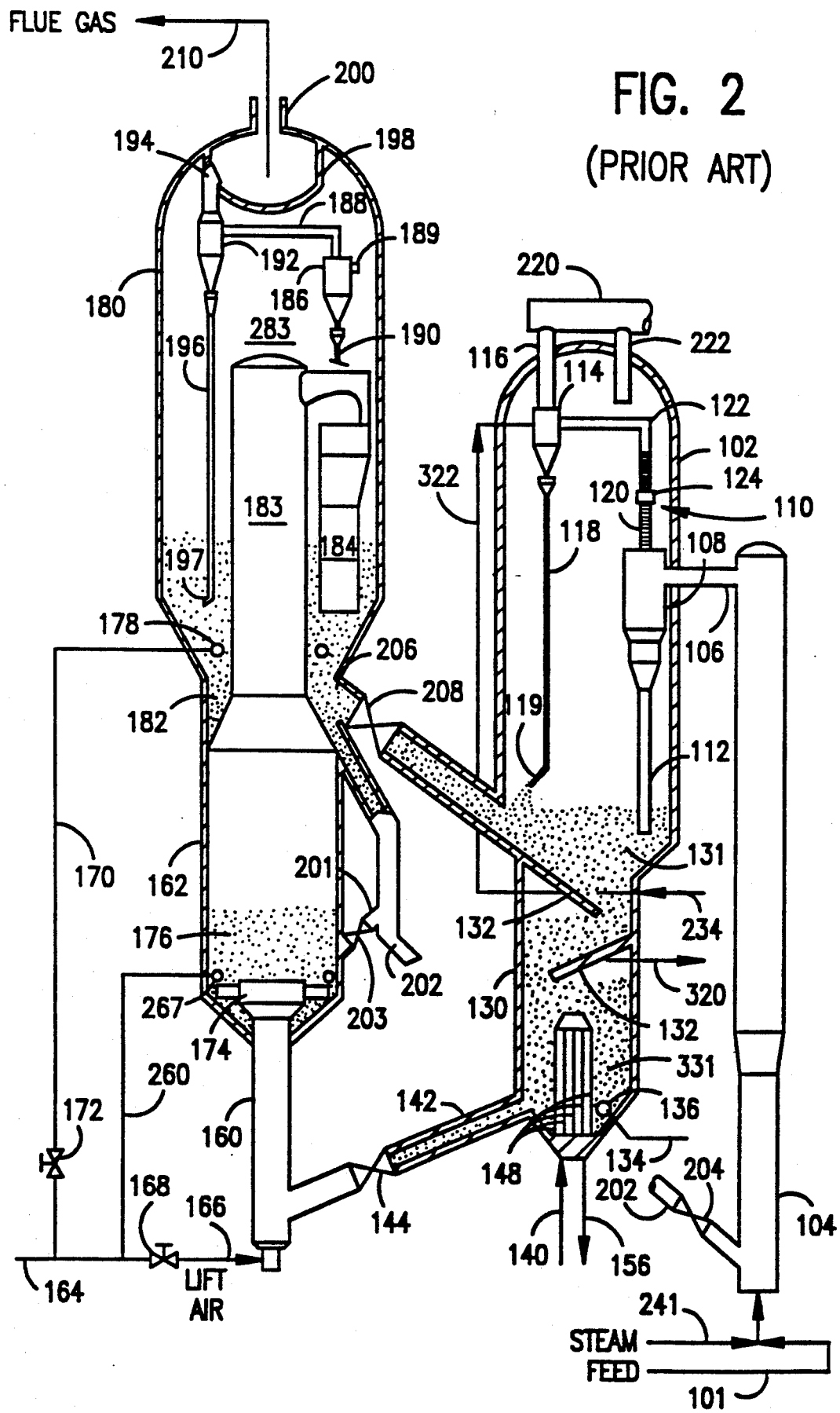
FIG. 2 (prior art) is a schematic view of a conventional high efficiency regenerator from U.S. Pat. No. 4,917,790.

FIG. 2 shows a conventional high efficiency regenerator, and riser reactor. It is taken from the Figure in U.S. Pat. No. 4,917,790, which is incorporated by reference. For simplicity, much auxiliary equipment such regenerators have, such as valves and pumps, is not shown. The catalyst cooler and hot stripper arrangement are preferred but optional. Other catalyst coolers not shown may also be associated with the regenerator as in U.S. Pat. No. 4,757,039 and 4,820,404 which are incorporated by reference.

A heavy feed is charged via line 101 to the lower end of a riser cracking FCC reactor 104. Hot regenerated catalyst is added via standpipe 102 and control valve 204 to mix with the feed. Preferably, some atomizing steam is added, via means not shown, to the base of the riser, usually with the feed. With heavier feeds, e. g., a resid, 2-10 wt. % steam may be used. A hydrocarbon-catalyst mixture rises as a generally dilute phase through riser 104. Cracked products and coked catalyst are discharged via riser effluent conduit 106 into first stage cyclone 108 in vessel 102. The riser top temperature, the temperature in conduit 106, ranges between about 480 and 615° C. (900 and 1150° F.), and preferably between about 538 and 595° C. (1000 and 1050° F.). The riser top temperature is usually controlled by adjusting the catalyst to oil ratio in riser 104 or by varying feed preheat.

Cyclone 108 separates most of the catalyst from the cracked products and discharges this catalyst down via dipleg 112 to a stripping zone 130 located in a lower portion of vessel 102. Vapor and minor amounts of catalyst exit cyclone 108 via gas effluent conduit 120 and flow into connector 124, which allows for thermal expansion, to conduit 122 which leads to a second stage reactor cyclone 114. The second cyclone 114 recovers some additional catalyst which is discharged via dipleg 118 to the stripping zone 130.

The second stage cyclone overhead stream, cracked products and catalyst fines, passes via effluent conduit 116 and line 220 to product fractionators not shown in the figure.

The coked catalyst discharged from the cyclone diplegs collects as a bed of catalyst 131 in the stripping zone 130. Dipleg 112 is sealed by being extended into the catalyst bed 131. Dipleg 118 is sealed by a trickle valve not shown.

Although only two cyclones 108 and 114 are shown, many cyclones, 4 to 8, are usually used in each cyclone separation stage. A preferred closed cyclone system is described in U.S. Pat. No. 4,502,947 to Haddad et al, which is incorporated by reference.

Stripper 130 is a "hot stripper." Hot stripping is preferred, but not essential. Spent catalyst is mixed in bed 131 with hot catalyst from the regenerator. Direct contact heat exchange heats spent catalyst. The regenerated catalyst, which has a temperature from 55° C. (100° F.) above the stripping zone 130 to 871° C. (1600° F.), heats spent catalyst in bed 131. Catalyst from regenerator 180 enters vessel 102 via transfer line 206, and slide valve 208 which controls catalyst flow. Adding hot, regenerated catalyst permits first stage stripping at from 55° C. (100° F.) above the riser reactor outlet temperature and 816° C. (1500° F.). Preferably, the first stage stripping zone operates at least 83° C. (150° F.) above the riser top temperature, but below 760° C. (1400° F.).

In bed 131 a stripping gas, preferably steam, flows countercurrent to the catalyst. The stripping gas is preferably introduced into the lower portion of bed 131 by one or more conduits 341. The stripping zone bed 131 preferably contains trays or baffles not shown. Stripping vapors enter the atmosphere of the vessel 102 and exit this vessel via outlet line 222 or by passing through the annular space 110 defined by outlet 120 and inlet 124.

The present invention also works well with conventional strippers, or with long residence time steam strippers, or with strippers having internal or external heat exchange means.

The stripped catalyst passes through the conduit 142 into regenerator riser 160. Air from line 166 and catalyst combine and pass up through an air catalyst disperser 174 into coke combustor 162 in regenerator 180. In bed 162, combustible materials, such as coke on the catalyst, are burned by contact with air or oxygen containing gas.

Although not shown, it is possible to include in riser mixer 160 some recycled, hot regenerated catalyst. Recycle of hot, regenerated catalyst heats the spent catalyst and promotes faster coke combustion. Catalyst recycle to the coke combustor via a hot stripper, or to the coke combustor, or to the riser mixer below the coke combustor is preferred to promote rapid coke combustion.

Additional air, preferably 5-50% of total air, is added to the coke combustor via line 260 and air ring 267. In this way the first stage of regeneration in regenerator 180 can be done with as much air as desired. The first stage, roughly lumping the regeneration in the coke combustor and riser mixer, can achieve quite a lot of coke removal. Complete afterburning of CO to $CO_2$ is difficult to achieve in the coke combustor, and not necessary or desirable. Burning much of the poorly stripped hydrocarbons at relatively mild, even reducing conditions, in riser mixer 160 and to a lesser extent in the coke combustor, fast fluidized bed 176 minimizes NOx formation and minimizes steaming of the catalyst.

High temperatures promote rapid coke combustion, and CO afterburning. The temperature of fast fluidized bed 176 in the coke combustor 162 may be increased if necessary by recycling some hot regenerated catalyst thereto via line 201 and control valve 203. If temperatures in the coke combustor are too high, some heat can be removed via a catalyst cooler, not shown, as tubes immersed in the fast fluidized bed in the coke combustor.

In coke combustor 162 the combustion air, regardless of whether added via line 160 or 260, fluidizes the catalyst in bed 176, and subsequently transports the catalyst continuously as a dilute phase through the regenerator riser 183. The dilute phase passes upwardly through the riser 183, through the riser outlet and into down discharging side arms 184. Some regenerators have the dilute phase transport riser discharge into cyclone separators.

Flue gas is removed from the regenerator by passage through one or more, typically two stages of cyclone separation. Flue gas enters primary cyclone 186 via inlet 189. Flue gas, with a greatly reduced solids content is discharged via line 188 and passes through the second stage cyclone 192. Flue gas is discharged via exhaust line 194 into plenum 198 and removed via outlet 200 and flue gas line 210.

The hot, regenerated catalyst forms the bed 182, from which it is reused in the FCC reactor, the hot stripper, or recycled to the coke combustor.

The regenerator shown in FIG. 2 (Prior Art) represents an excellent high efficiency regenerator. The only drawback to such a unit is that the extremely large catalyst traffic in the dilute phase region 283 downstream of the transport riser can cause emissions problems, unless cyclones are used on the transport riser outlet.

Cyclones help reduce dilute phase catalyst loading, but increase pressure drop. Cyclones are not always easy to install in high efficiency regenerators such as that shown, because the cyclones, diplegs, and catalyst holdup weigh a lot, and are difficult to install in many units. Cyclones are especially hard to install in a bubbling dense bed regenerator modified to contain a fast fluidized bed region in a portion thereof.

The regenerators such as those shown in FIG. 2 are efficient, but consume a lot of energy, in the form of blower horsepower. The amount of air needed is usually fixed by the delta coke on catalyst. Enough air must be added to remove all the coke deposited on each pass through the reactor, otherwise the cracker would soon become a coker. The amount of power required to drive the compressor depends on the volume of air required (and this is fixed by the coke yield of the process) and the pressure drop needed to get the air through the regenerator and downstream processing equipment.

The pressure drop across a coke combustor and transport riser operating without cyclones will usually be about 1 to 2 psi. Such units will have fairly large catalyst loadings in the dilute phase region 283 above the second dense bed. When cyclone separators are used, the particulates emission decrease, but the pressure drop across the coke combustor, transport riser and cyclones will be higher, usually about 1.5 to 3.0 psi.

Figure 3:
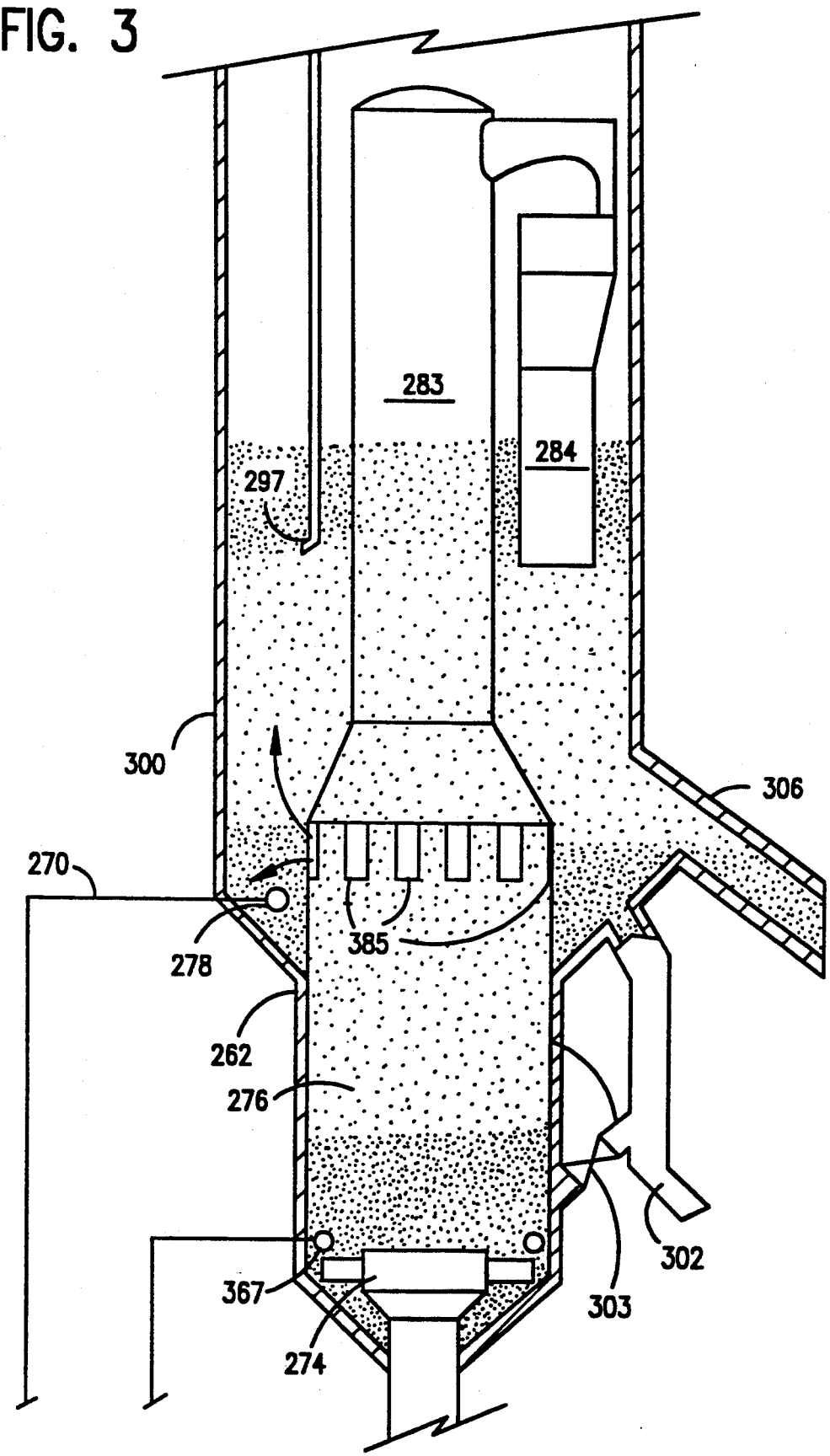
FIG. 3 (invention) is a schematic view of a low pressure drop regenerator of the invention in a multi-vessel regenerator.

In FIG. 3 (invention—multiple vessel regenerator) only the changes required to achieve low pressure drop regeneration are discussed. Most of the regenerator apparatus is unchanged from that shown in FIG. 2, and need not be discussed.

In the preferred embodiment shown in FIG. 3 the reactor, stripper, riser mixer 160 and coke combustor 162 are unchanged mechanically from FIG. 2.

The second fluidized bed region of the regenerator, region 300 has been considerably enlarged, or rather extended downwardly to encompass more of the upper regions of the coke combustor. This allows catalyst to flow from relatively dense phase regions of fast fluidized bed 376 laterally into the second fluidized bed via a plurality, preferably 4 or more, of openings 385. This allows much of the catalyst to "short circuit" the transport riser region 283.

The top of the transport riser, and side discharging arms 284 can simply be left in place, and most of the vapor will usually exit the transport riser through these conventional openings. Much, and preferably most of the catalyst will exit the transport riser via openings 385.

The fluid flow in the coke combustor and transport riser will now be reviewed in more detail, to describe some of the changes brought about by addition of windows 385.

The fast fluidized bed region 376 shown, in the process of the present invention, can operate with more, or with less, catalyst inventory, than conventional coke combustors. If an existing high efficiency regenerator is modified by providing a downwardly extending skirt 300 and windows 385, with the size of the coke combustor kept unchanged, then usually the catalyst inventory in the coke combustor will increase some. This is because most coke combustors now in operation have a relatively dense phase fluidized bed in the middle and lower portions of the coke combustor, and relatively dilute phase operation in upper portions of the coke combustor. My process works best when catalyst flow through windows is from a relatively dense phase fluidized bed to another relatively dense phase fluidized bed through openings which are relatively small, as compared to the cross-sectional area of the dilute phase transport riser. Excessive vapor traffic through the windows is prevented because both sides of the window are preferably somewhat sealed by the relative dense phase fluidized beds on each side.

Preferably, in new units, the size of the coke combustor is reduced so that more and preferably 90% or more of the volume of the coke combustor is relatively dense phase fast fluidized bed. The coke combustor can be made any size that is desired, with the process of the present invention ensuring that more of its volume is productively used than occurred in prior designs. Reduced size of the coke combustor, and somewhat reduced superficial vapor velocities, are especially beneficial when multi-stage regeneration of catalyst is desired. Much of the regeneration air will simply be shifted to the second fluidized bed, rather than have it all added to the coke combustor, as is now the common commercial practice.

Usually the amount of catalyst recycle will be somewhat reduced in the process of the present invention.

Even when the superficial vapor velocity in the coke combustor is essentially the same as in a prior art high efficiency regenerator, the unit will not act like the prior art units. When essentially all of the catalyst regeneration occurs in the coke combustor, i.e., the regenerator is a single stage regenerator, the superficial vapor velocity in the base of the coke combustor will be essentially the same as in a prior art unit, because a fixed volume of air is needed to burn off the net coke make in the FCC reactor. The gas and catalyst loading in the transport riser above the coke combustor will change significantly.

Much, and preferably most of the catalyst will simply bypass the transport riser, and the pressure drop associated with the riser and the side discharging arms, and simply exit the unit transversely. This loss of catalyst, usually in excess of 50%, greatly changes the catalyst loading in the upper regions of the transport riser and to a lesser extent in the upper regions of the regenerator, region 283, at least catalyst loading due to catalyst carried out the transport riser outlet. There will be some increase in catalyst traffic above the second fluidized bed 382 due to an increase in superficial vapor velocity due to vapor bypassing the transport riser via windows 85 and passing directly into the second dense bed region 182. The gas from the transport riser may be used in part as fluffing air, so that the superficial vapor velocity due to fluffing air can be reduced slightly. To ensure good fluidization a certain amount of fluffing air will still be needed, but perhaps only 5 to 10% more than that needed to maintain bubbling dense bed fluidization. The net effect of all these changes will usually be to reduce somewhat catalyst traffic in region 283.

Much, but preferably a minority, of the flue gas and perhaps some combustion air will also exit with the bypassing catalyst via the windows 385. The greatly reduced catalyst traffic, above windows 385 and somewhat reduced vapor traffic, will produce a sharp drop in catalyst loading, or density, of the dilute phase region in the transport riser just above or downstream of windows 385. This reduced density will decrease the pressure drop needed to get through the transport riser and outlet and outlet cyclones, if used.

Because of the low density of the dilute phase region in the transport riser above windows 385, the pressure differentials throughout the regenerator will be reduced. Phrased another way, the pressure drop through the transport riser will be relatively small, so relative flows up the transport riser and window opening 385 will be roughly proportional to the cross sectional areas available for flow.

If 4 windows 85 are used, each with an opening of 0.5 square meters, the total "window" opening will be 2 m$^2$. If these are assumed to be half covered with relatively dense phase catalyst and half in dilute phase, i.e., if ½ of the window is available for vapor flow, then a window of 1 m$^2$ will be available to the flue gas. If 4 uniformly sized vapor outlets at the top of the transport riser are used, the total cross sectional area of these vapor outlets is 1 m$^2$. Roughly 50% of the vapor will bypass the transport riser, and the remainder will pass through the traditional outlets.

Windows 385 can be effectively shut to vapor flow by seeing that they are sealed with a relatively dense phase fluidized bed of catalyst, either on the inside or the outside or preferably both. The tenuous, relatively shallow, and perhaps one sided sealing of the windows 385 both permits, and makes essential, low pressure drop operation from the coke combustor through the transport riser to the second fluidized bed.

The windows 385 should be placed where they will do the most good. If placed near in transport riser, where fully developed dilute phase flow occurs, they will be too high. Little reduction in pressure drop will be achieved, and excessive vapor flow into the second fluidized bed or above it will occur. Catalyst loading in the dilute phase region above the second dense bed will be excessive. If placed too low, e.g., deep within the base of the coke combustor, or deep within the second fluidized bed several problems can occur. Too low placement will tend to stir up the second fluidized bed and may increase entrainment. Low placement will mean additional pressure drop will be required, equal to the head developed by the second dense bed above the windows.

The optimum placement of the windows 385 will usually be at or below the top of dense bed 382. I prefer to have the windows at least partially immersed in the dense bed. This seals the windows to some extent, and prevents wholesale bypassing of the coke combustor. There will usually be a stream of somewhat dense phase catalyst and some dilute phase vapor passing from the central region through the windows to the outer annular region. This placement will avoid high pressure drops associated with flue gas forcing its way up through the catalyst bed, and minimize catalyst traffic in the dilute phase regions above the second dense bed.

Depending on the L/D ratio of the windows, a placement of the windows just under the surface of the second fluidized bed makes it possible to provide an additional mechanism for recycle of hotter catalyst into the central region, and provides a mechanism whereby close control of catalyst flows is not critical. If the catalyst inventories in the regenerator are excessive, and if windows having an L/D in excess of 1, and preferably in excess of 2, or if windows at multiple elevations are used, then in it possible for catalyst to flow from the outer annular region into the coke combustor. This will increase catalyst recycle to the coke combustor, but at a very modest cost in terms of pressure drop needed to get catalyst into the coke combustor. Catalyst can flow into the coke combustor in the lower portions of the windows, while flowing out of the coke combustor from the upper portions of the windows.

As applied to high efficiency regenerators, the process of the present invention can reduce the pressure drop associated with such units. Although this is beneficial, it does not represent the best use of this technology. This is because high efficiency regenerators are usually relatively new units, well designed and inherently efficient, so that emissions problems and pressure drop problems are not severe. The process of the present invention will of course permit these units to adapt to changing emissions requirements, or reduce the cost of any expansion of the unit.

The most efficient application of this technology will in older regenerators, those using bubbling dense beds to regenerate the catalyst. These are inherently inefficient, exceedingly large, and hard to modify. There is a great need for a way to make these older units behave more like high efficiency regenerators. The process of the present invention brings about several improvements in bubbling bed regenerators. Single vessel regenerators can approach the performance of multi-vessel high efficiency regenerators. The regenerator throughput can be greatly increased, or multi-stage regeneration can be achieved, all within the confines of an existing regenerator containment vessel. This can be seen by a review of the FIG. 4.

Figure 4:
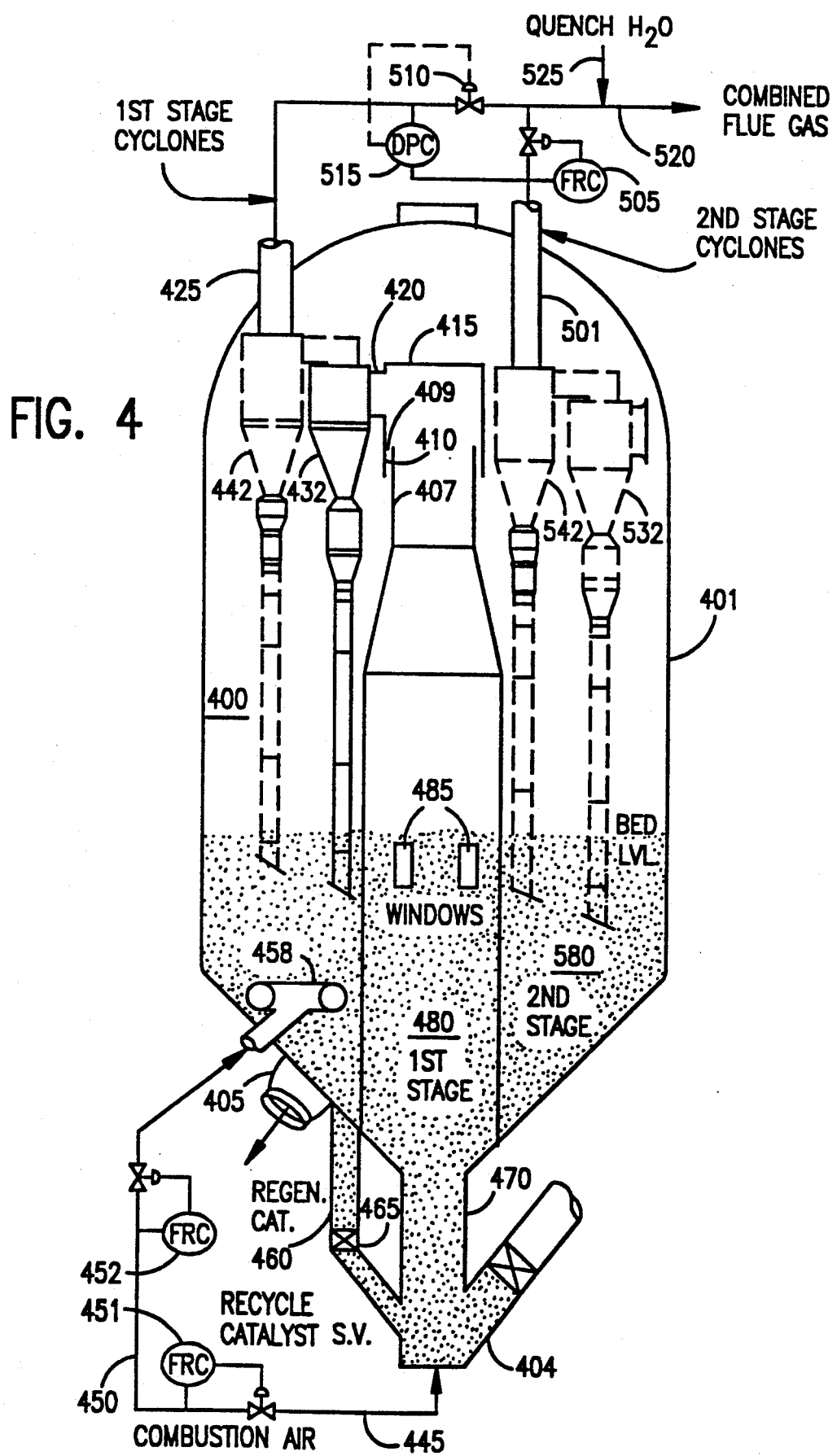
FIG. 4 (invention) is a schematic view of a regenerator of the invention in a multi-stage, single vessel regenerator.

FIG. 4 shows a highly preferred, and optimized, bubbling dense bed regenerator using the low pressure drop "windows" approach to regeneration. The FIG. 4 embodiment also includes a new approach to cyclone separation, which greatly facilitates multi-stage operation, and permits fast fluidized bed regeneration with greatly reduced particulates emissions. It permits true multi-stage operation, with isolation of the flue gas from each stage of the regenerator.

Spent catalyst is charged to the regenerator 401 via a spent catalyst inlet 404 connective with the base of a riser mixer section 470 and catalyst recycle line 460. The riser mixer is preferred but not essential. It mixes spent catalyst from line 404 with recycled hot regenerated catalyst from line 460, with catalyst flow controlled by slide valve 465, and combustion air added via line 445. Flow recorder controller 451 is preferably used to monitor and control air addition rate. The riser mixer heats the spent catalyst so that it "lights off" in the transport riser to some extent and to a great extent in the primary combustion stage 480.

The primary combustion stage 480 can operate under any fluidized regime, but preferably operates with a superficial vapor velocity somewhat short of that which would cause dilute phase transport flow. It may operate as an expanded bed, bubbling dense bed, turbulent fluidized bed or even as a fast fluidized bed. Preferably the air admission rate, and the cross-sectional area available for flow, and catalyst addition and catalyst recycle, if any, are adjusted to maintain much or all of the bed in region 180 in at least a turbulent fluidized condition, and preferably in a "fast fluidized condition", characterized by intense agitation, relatively small bubbles, and rapid coke combustion. In terms of superficial vapor velocity and typical FCC catalyst sizes, this means the vapor velocity should exceed 3.5 feet per second, preferably is 4-15 feet per second, and most preferably is 4-10 feet per second. The catalyst density in a majority of the volume in the coke combustor will be less than 35 pounds/cubic foot, and preferably is less than 30 pounds/cubic foot, and ideally about 25 pounds/cubic foot.

The densities and superficial vapor velocities discussed herein presume that the unit operates at a pressure where the vast majority of FCC units operate, namely 2-40 psig. A few might operate at slightly lower pressures, and a significant minority may operate at somewhat higher pressures, primarily those with power recovery systems. Changes in pressure change the superficial vapor velocity needed to maintain, e.g., a fast fluidized bed or a bubbling dense bed. It is easy to calculate the superficial vapor velocity needed to support a given type of fluidization, and the bed density expected at those conditions. In general, an increase in pressure will decrease the superficial vapor velocity needed to achieve a fast fluidized bed.

The first stage region 480 can be the only stage or catalyst regeneration, or it can also partially regenerate the catalyst, leaving further regeneration to a downstream portion of the regenerator. Regardless of the percent coke removal that occurs in the first stage or in downstream stages, the regenerated or partially regenerated catalyst and flue gas must be removed from the region 480. This removal of catalyst and flue gas is different from anything heretofore practiced in FCC regeneration.

A significant amount, at least 25 volume %, and preferably a majority, and most preferably in excess of 90% of the flue gas leaves as an upflowing dilute phase of flue gas with a minor amount of catalyst present. This upflowing dilute phase stream passes via upper outlet 407 into suspended cover 415. Cover 415 has a bottom portion 410, preferably a length of pipe or tubing, which encompasses outlet 407, leaving only a small annular space 409. Most, and essentially all, of the flue gas from the first combustion stage will exit via line 420 to the primary cyclones 432, then to the secondary cyclones 442 and finally to primary stage flue gas outlet 425.

Cover 415 preferably is supported, or hangs from, either the top of the regenerator containment vessel 401, or alternatively by the cyclones 432. Although only a single cyclone 432 is shown, in practice multiple cyclones, in parallel, with multiple inlets 420 will usually be required to handle the large volumes of flue gas exiting the primary regeneration stage. The slip fit, as evidenced by annular opening 409, allows the different parts of the regenerator to expand and contract with changes in temperature without undue stress. Because of the large size of the units, and high temperatures and swings in temperature, it is not usually feasible to rigidly connect the base of the regenerator with the top. My design allows the cyclones and first stage cap or cover 415 to be supported by the top of the vessel, with no direct connection to the base of the vessel. In this way the first regeneration stage 480 can expand or contract as much as desired, typically 4 to 12", without fatiguing the cyclone supports. In this way, I can remove the flue gas from the first combustion stage, and cause the flue gas and entrained catalyst to pass through one or more stages of cyclone separators, so that undue catalyst traffic in the dilute phase region 400 of regenerator 401 can be avoided. If desired, the annular opening 409 may be packed with fibrous material, or some other means to further restrict gas flow, but usually this will not be required.

In a marked departure from prior designs using a fast fluidized bed coke combustor, much of the catalyst does not exit the vessel with the flue gas. A significant amount, at least 25 wt %, preferably a majority, and most preferably at least 80% or more of the catalyst exits region 480 through a plurality of windows or apertures 485. There will continue to be a significant amount of entrainment of catalyst with flue gas, but much, and preferably most of the catalyst will simply flow sideways, through windows 485 into the second fluidized bed, region 580, which will usually be a bubbling dense bed. Region 580 may also be a turbulent fluidized bed, or a fast fluidized bed region, but in most units operation with region 580 as a bubbling dense bed will be satisfactory, and will also minimize catalyst traffic in dilute phase region 400 above dense bed 580.

The air blower, or other air supply means, will generally do less work in the process and apparatus of the present invention, as compared to prior art designs involving fast fluidized bed coke combustors. The compressor in the prior art design is called on to do a fair amount of work in lifting all of the spent catalyst (which will usually be on the order of 10 to 50 tons of catalyst per minute) from the base of the riser mixer through the coke combustor and through the dilute phase transport riser and any cyclones which may be present on the transport riser outlet. The catalyst traffic is frequently increased by another 100-300% due to catalyst recycle. Much energy is consumed lifting these tons per minute of catalyst up 10-30 feet in the regenerator, only to have this energy wasted when the catalyst falls down to the dense bed region 580.

I avoid much of this work by providing the catalyst with another way to leave the first stage region 480.

Windows 485 permit much, and preferably a majority, of the catalyst to pass from the first combustion stage to the second, without passing up through the dilute phase transport riser. There will still be considerably entrainment of catalyst in flue gas in the dilute phase transport riser, and much catalyst traffic in the cyclones 432 and 442, but the much of the catalyst can simply flow from region 480 through windows 485 into the second fluidized bed 580.

Changing the inventory of catalyst in the regenerator, and/or changing the superficial vapor velocity in the primary regeneration stage, and shifting the pressure balance in the unit, as discussed hereafter, can shift the amount of catalyst which is removed with the dilute phase flue gas and the amount which flows laterally via windows 485.

Catalyst Collection/Second Stage Regeneration

The process and apparatus of the present invention permit a second stage of catalyst regeneration to occur, but this is not essential. The reduced operating costs and improved regeneration efficiency from my low pressure drop regeneration process, justify the capital cost of installing the invention, even when the only regeneration that occurs is in the coke combustor in region 480. The operation of the second stage region 580, which can function as an additional regeneration stage, or merely as a regenerated catalyst collection means, will now be reviewed.

Catalyst in the second fluidized bed 580, regardless of whether entrained overhead in flue gas from the first stage, or entering in relatively dense phase lateral flow via windows 485, can be, and preferably is, subjected to an additional stage of regeneration. Additional combustion air may be added via air line 450 and flow recorder controller 452, and distributed via one or more air rings indicated as 458, into region 580. Even if no additional regeneration is needed, it will usually be essential to have a certain amount of fluffing air, sufficient to maintain fluidization.

Catalyst is preferably recycled from the second regeneration stage to the inlet to, or directly into, the first stage of regeneration. In the embodiment shown hot regenerated catalyst is removed via line 460, with the amount controlled by slide valve 465, and passed into the base of region 470. Although this is preferred it is not essential. Elimination of catalyst recycle will frequently limit the amount of carbon burning achievable in the first stage, so some catalyst recycle will usually be practiced.

Hot, regenerated catalyst is withdrawn from the regenerator via line 405, for reuse in the FCC process. In many regenerators only a single catalyst withdrawal means 405 is provided, with catalyst from this single line going to the reactor, recycled to the regenerator (especially when a riser mixer such as 470 is used) and-/or recycled to a hot catalyst stripper, not shown.

The flue gas from both the first stage region and the second stage region will contain large amounts of catalyst. The regenerator preferably uses conventional flue gas/catalyst separation means, such as cyclone, disposed in an unconventional way, to effectively isolate both flue gas streams.

Multiple cyclones are usually needed to deal with the extremely large flows involved in an FCC regenerator. Several stages of cyclone separation are needed, and additional stages, e.g., tertiary cyclones, or porous stainless steel filters may be needed to meet local regulations on particulates in flue gas.

The primary cyclones 432 associated with the first regenerator stage (typically 4–6 in parallel) are preferably radially disposed about cap 415.

The primary cyclones 532 associated with the second regenerator stage (typically 4–6 in parallel) will separate entrained catalyst from flue gas or fluffing air rising up from second fluidized bed 580. The secondary cyclones 542 on the second regenerator stage remove additional amounts of entrained catalyst, and discharge a flue gas with a reduced fines content via line 501. Recovered catalyst is discharged via diplegs into the second fluidized bed 580.

The flue gas from the second combustion stage is effectively isolated from the flue gas discharged from the primary combustion stage because the only a trivial amount of gas traffic occurs across annular opening 409. This permits multiple stages of regeneration, and even permits use of different atmospheres in each regeneration stage.

One of the significant benefits of coke combustion in two stages, as shown in the FIG. 4, is that the second stage region, bed 580 and the dilute phase region 400 is a much drier atmosphere than is experienced in the primary regeneration stage, fluidized bed region 480. There is a lower steam partial pressure in the second regeneration stage, or the catalyst collection stage if regeneration is completed in the first stage, because the water of combustion, and entrained stripping steam, are removed with the flue gas from the first stage of combustion. The entrained steam and the hydrogen rich fast coke are more than 90% removed in the first stage of regeneration, so the second stage is much drier.

The flow scheme shown in the Figures may also be reversed, i.e., addition of spent catalyst can occur radial out to in, or a side by side arrangement may be used. Although possible, such arrangements are not preferred. It usually will be easier to efficiently burn coke in a vigorously fluidized central region, and complete regeneration, or collection, in the outer annular region When multiple stages of catalyst regeneration are practiced, preferably from 20 to 90% of the coke combustion occurs in the first stage, with the remainder in the second stage.

In many units the optimum amount of coke combustion that occurs in each zone will depend on quite a few factors, the amount of sulfur and nitrogen in the feed, rate of catalyst replacement, metals contamination in the feed, etc. For cleanest catalyst, when metals and NOx emissions are not a problem, it is beneficial to front load the air addition, i.e., to maximize coke combustion in the first stage, and maintain fast fluidized bed conditions therein. To minimize NOx, coke combustion should be delayed, so that large amounts of carbon will be present to hinder NOx formation.

The first and second regeneration stage flue gas streams may be mixed together, as shown in FIG. 4. Considerable fine tuning of the amount of gas withdrawn from each region is possible by the use of flow recorder controller 505, and differential pressure controller 515 operating in conjunction with flow control valve 510. The flue gas streams may be mixed, as shown, and if this is done it will usually be beneficial to provide water quench injections means 525 connective with combined flue gas stream line 520, so that if afterburning occurs dangerous temperature excursions may be prevented. It is also possible, and may be preferred to keep the two flue gas streams isolated. When one stage of the regenerator, e.g., the first, is run in partial CO burn mode the resulting CO rich flue gas can be sent to a CO boiler. If the second stage is run in complete CO burn mode, to produce cleanly regenerated catalyst, the resulting high temperature, somewhat oxygen rich flue gas, can simply be sent to the refinery flare system.

DESCRIPTION OF PREFERRED EMBODIMENTS

FCC Feed

Any conventional FCC feed can be used. The process of the present invention is especially useful for processing difficult charge stocks, those with high levels of CCR material, exceeding 2, 3, 5 and even 10 wt % CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids, and mixtures thereof. The present invention is most useful with feeds having an initial boiling point above about 650° F.

FCC Catalyst

Any commercially available FCC catalyst may be used. The catalyst can be 100% amorphous, but preferably includes some zeolite in a porous refractory matrix such as silica-alumina, clay, or the like. The zeolite is usually 5-40 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

Additives for removal of SOx are available from several catalyst suppliers, such as Davison's "R" or Katalistiks International, Inc.'s "DeSox."

CO combustion additives are available from most FCC catalyst vendors.

The FCC catalyst composition, per se, forms no part of the present invention.

Cracking Reactor/Stripper/Regenerator

The FCC reactor, stripper and regenerator shell 4, per se, are conventional, and are available from various licensors, or will already be in existence in many refineries.

The modifications needed to add the modifications shown in FIG. 2 are well within the skill of the art. The cyclones etc are all conventional, what is unconventional is the disposition of the cyclone inlets to partition the dilute phase region.

Regenerator Process Conditions

Conditions in the regenerator can be conventional. Preferably at least the first stage is conducted at fast fluidized bed regeneration conditions, with velocities approaching those used in typical H.E.R. regenerators, such as those shown in U.S. Pat. No. 4,595,567 (Hedrick), 4,822,761 (Walters, Busch and Zandona) and U.S. Pat. No. 4,820,404 (Owen), which are incorporated herein by reference.

Benefits of Staged Combustion

The process of the present invention achieves several important objectives in the shell of an existing regenerator. Among the objectives are increased coke burning capacity, reduced NOx emissions, and reduced catalyst deactivation. Each will be briefly reviewed.

Increased coke burning capacity can be achieved in several ways. When, e.g., the central region is operated at fast fluidized bed conditions more coke can be burned because each square foot of the old bubbling bed regenerator can be used as productively as before, while the central region, run as an FFB, burns two to three times as much coke per square foot of cross sectional area as compared to a bubbling bed regenerator. Partial CO combustion, leaving a significant amount of CO in the flue gas from the first or the second stage, or both, allows a given volume of air to burn more coke. Operating the first stage in partial CO burn mode, and the second stage in full CO burn mode, can produce unusually clean, or low coke containing, catalyst, while shifting some of the oxygen requirement and consequent heat generation to units downstream of the FCC regenerator.

Reduced NOx emissions can be achieved if most of nitrogen compounds are burned under relatively mild, perhaps even partially reducing conditions in the first regeneration stage. The presence of carbon during first stage regeneration tends to suppress formation of NOx, so that large amounts of coke combustion can be achieved without inordinate amounts of NOx being formed. Partial CO combustion mode in the first stage will greatly reduce or eliminate NOx emissions from the first stage.

Improved catalyst stability is obtained by steaming the catalyst less. More than 90% of the "fast coke" or hydrogen rich coke will usually be removed in the first regeneration stage. The complete regeneration of the catalyst, and removal of the "hard coke", and the highest temperatures, and the most oxidizing conditions, can be left to the second regeneration stage. This staged combustion allows most of the water of combustion to be formed and rapidly removed, in the flue gas from the first regeneration stage, allowing drier regeneration of catalyst in the downstream regions, e.g., the bubbling dense bed. The hydrogen rich coke is largely eliminated in the first stage, so there will be significantly less water of combustion formed in the bubbling dense bed. There will still be reduced catalyst deactivation because of the drier operation of the second stage.

CO Combustion Promoter

Use of a CO combustion promoter in the regenerator or combustion zone is not essential for the practice of the present invention, however, it is preferred. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit.

FCC Reactor Conditions

Conventional cracking conditions may be used. Typical riser cracking reaction conditions include catalyst/oil ratios of 0.5:1 to 15:1 and preferably 3:1 to 8:1, and a catalyst contact time of 0.1 to 50 seconds, and preferably 0.5 to 5 seconds, and most preferably about 0.75 to 2 seconds, and riser top temperatures of 900 to about 1050° F.

ILLUSTRATIVE EMBODIMENT

Two conventional regeneration processes of the prior art, a single dense bed regenerator, and a conventional high efficiency regenerator were compared against a multi-stage regeneration process of the invention. The comparisons being made are for units processing a resid feed to the same reactor severity level. The regenerators are being operated to burn coke off of the catalyst to the same level on regenerated catalyst.

I. Single Dense Bed Regenerator (Prior Art)

This case illustrates the problem. Many refineries have these regenerators, and they are plagued with the need for excessive catalyst inventories, and consequently excessive catalyst steaming.

| CASE I CONVENTIONAL | |
|---|---|
| Catalyst Circulation | 3134777 lbs/hr |
| Regenerator Dense Phase Temp | 1305° F. |
| Regenerator Dilute Phase Temp | 1355° F. |
| Air Rate | 153 MSCFM |
| Regenerator Superficial Velocity | 4.9 ft/sec |
| Catalyst Inventory | 198925 lbs |
| Catalyst Cooler Duty | 245.9 MM BTU/HR |
| Carbon on Regenerated Catalyst | 0.08 wt % |
| Flue Gas Comp. (Dry) | |
| CO | 0.02 mol % |
| $CO_2$ | 16.07 |
| $N_2$ | 82.14 |
| $O_2$ | 1.77 |

II. High Efficiency Regenerator (Prior Art)

Catalyst regeneration in a modern high efficiency regenerator is a significant improvement over bubbling dense bed regeneration (Case I). Catalyst inventories are typically reduced 30-60% for the same cracking capacity, as compared to bubbling dense bed regenerators. Although such regenerators are preferred, it usually costs too much to simply replace an existing bubbling dense bed regenerator with a high efficiency regenerator. Case II thus represents something that is preferred but not obtainable in refineries with older type regenerators.

| CASE II HIGH EFFICIENCY | |
|---|---|
| Catalyst Circulation | 3134777 lbs/hr |
| Regenerator Dense Bed Temp | 1311.6° F. |
| Regenerator Top Temp | 1320.4° F. |
| Air Rate | 153 MSCFM |
| Regenerator Superficial Velocity | 4.9 ft/sec |
| Catalyst Inventory | 143685 lbs |
| Catalyst Cooler Duty | 243.6 MM BTU/HR |
| Carbon on Regenerated Catalyst | 0.05 wt % |
| Flue Gas Comp (Dry) | |
| CO | 0.05 vol % |
| $CO_2$ | 16.10 |
| $N_2$ | 82.13 |
| $O_2$ | 1.71 |

III Multi-Stage Regenerator (Invention)

This case involves computer simulation of a preferred regenerator of the invention, with a relatively fast fluidized bed primary stage of regeneration, and a bubbling dense bed second stage of regeneration.

| CASE III INVENTION | | | |
|---|---|---|---|
| | Stage 1 | Stage 2 | Total |
| Catalyst Circulation | 3134777 | 3134777 lbs/hr | |
| Regenerator Dense Phase Temp. | 1261 | 1311° F. | |
| Regenerator Dilute Phase Temp. | 1256 | 1363° F. | |
| Air Rate | 68.85 | 63.85 MSCFM | 132.70 |
| Regenerator Superficial Vel | 5.0 | 4.8 ft/sec | |
| Catalyst Inventory | 89577 | 84038 | 173615 |
| Catalyst Cooler Duty | 0 | 174.1 | 174.1 |

| -continued CASE III INVENTION | | | |
|---|---|---|---|
| | Stage 1 | Stage 2 | Total |
| Flue Gas Comp. | | | |
| CO | 6.46 | 0.04 | |
| $CO_2$ | 12.35 | 17.41 | |
| $N_2$ | 81 19 | 81.39 | |
| $O_2$ | 0.0 | 1.16 | |

When practiced in bubbling dense bed regenerators, such as that shown in FIG. 4, the process and apparatus of the present invention achieve effective catalyst regeneration, with reduced utility costs because of the lower pressure drop across the regenerator. Most of the catalyst flows through the windows cut in the wall of the first stage regenerator into the second stage annular bed.

The process and apparatus also lends itself to multistage fluidized bed regeneration of catalyst, with each fluidized bed and each flue gas stream isolated. The reduced catalyst traffic in the dilute phase from the first stage of regeneration permits use of relatively low efficiency, poorly sealed, cyclones to separate first stage flue gas from entrained first stage catalyst. Such cyclones can be supported or hung from the ceiling or sides of the regenerator vessel, and need not touch the upper portions of the first stage partition upper walls. This greatly simplifies the design of such equipment, primarily by eliminating thermal stress caused by differential thermal expansion.

I claim:

1. A process for low pressure drop, fast or turbulent fluidized bed regeneration of spent, coke containing fluidized catalytic cracking catalyst in a single regenerator vessel having a ceiling and a base and containing at least a primary and a secondary contiguous relatively dense phase fluidized beds, comprising:

charging said spent catalyst to a fast or turbulent fluidized bed primary regeneration stage having a coked catalyst inlet means, an oxygen containing regeneration gas inlet means in a lower portion of said primary stage, and a primary stage flue gas outlet in an upper portion thereof;

at least partially regenerating said coked catalyst by contacting said coked catalyst with said regeneration gas at fast or turbulent fluidized bed catalyst regeneration conditions to produce at least partially regenerated catalyst and flue gas;

vertically discharging flue gas and some entrained catalyst from said upper portion of said primary stage into a dilute phase region and into a primary stage flue gas outlet;

laterally removing at least a portion of said partially regenerated catalyst by passing same though at least one lateral opening in a side of said primary stage at an elevation intermediate said primary stage regeneration gas inlet and said primary stage flue gas outlet;

collecting said at least partially regenerated catalyst in said second fluidized bed; and removing regenerated catalytic cracking catalyst from said second fluidized bed as a product of the process.

2. The process of claim 1 wherein said primary regeneration stage comprises a vertical cylinder with a sidewall, and a plurality of vertical openings are radially distributed about said sidewall for lateral removal of catalyst.

3. The process of claim 1 wherein at least a majority of the catalyst removed from the primary regeneration stage is removed via said lateral openings.

4. The process of claim 1 wherein flue gas and entrained catalyst discharged from said primary regeneration stage flue gas outlet passes through at least one stage of cyclone separation to produce a flue gas stream with a reduced content of entrained catalyst and recovered entrained catalyst, and said recovered entrained catalyst is recycled to said primary regeneration stage.

5. The process of claim 1 wherein flue gas and entrained catalyst discharged from said primary regeneration stage passes through at least one cyclone separator having an inlet connected with said outlet of said primary combustion stage flue gas outlet.

6. The process of claim 5 wherein flue gas and entrained catalyst discharged from said primary combustion stage flue gas outlet passes through at least one cyclone separator having an inlet radially spaced from said outlet of said primary combustion stage.

7. The process of claim 5 wherein flue gas and entrained catalyst discharged up from said primary combustion stage passes through at least one cyclone separator having an inlet slip fit within said outlet of said primary combustion stage.

8. The process of claim 1 wherein additional regeneration gas is added to a lower portion of said second fluidized bed.

9. The process of claim 1 wherein said primary regeneration stage is operated at fast fluidized bed catalyst regeneration conditions.

10. The process of claim 1 wherein said secondary fluidized bed operates at bubbling fluidized bed conditions.

11. The process of claim 1 wherein catalyst regeneration occurs in both of said fluidized beds, and one of said regeneration stages operates under partial CO burning conditions and the other stage operates under complete CO burning conditions.

* * * * *